United States Patent [19]
Franson

[11] 3,774,837
[45] Nov. 27, 1973

[54] CARRYING BAG PROVIDED WITH A HANDLE

[75] Inventor: Otto Elving Franson, Jonkoping, Sweden

[73] Assignee: Munksjo Aktiebolag, Jonkoping, Sweden

[22] Filed: July 1, 1970

[21] Appl. No.: 51,624

[30] Foreign Application Priority Data
Jan. 20, 1970 Sweden................................ 632/70
Feb. 20, 1970 Sweden.............................. 2166/70

[52] U.S. Cl.............................................. 229/54 R
[51] Int. Cl............................................. B65d 33/08
[58] Field of Search..................... 229/54 R; 150/12

[56] References Cited
FOREIGN PATENTS OR APPLICATIONS
1,150,368    4/1969    Great Britain..................... 229/54 R
  109,119    3/1968    Denmark........................... 229/54 R
1,149,673    4/1969    Great Britain..................... 229/54 R

*Primary Examiner*—Donald F. Norton
*Attorney*—Kane, Dalsimer, Kane, Sullivan and Kurucz

[57] ABSTRACT
The carrier bag is of the type having two wide sides and a folded bottom and it is manufactured from a tubular synthetic resin web. At the open end the bag is provided with reinforcing folds or reinforcing strips extending transversely of the bag. Grip openings are punched out in the centre of the opening edge. The reinforcing folds or strips are welded to the wide sides of the bag by means of weld seams extending obliquely towards the opening edge, one on either side of the grip opening, and across the entire width of the folds or strips. The carrying grips are thus formed by the centre part of the reinforcing folds or strips between the two inclined weld seams. Consequently stresses on the handle are uniformly distributed on the four weld seams, in that each weld seam need only absorb a quarter of the load of the goods in the bag.

The machine for manufacturing the carrier bag comprises folding elements in the shape of folder rails for providing the reinforcing folds, or an automatic welding apparatus for securing the reinforcing strips to the bag. It also comprises a puncher for cutting out the grip openings and a welding device for producing the oblique weld seams on the folds or strips. The machine also includes a means for slitting open the tubular synthetic resin web in the longitudinal direction thereof.

The invention also includes a method for the manufacture of the carrier bag.

3 Claims, 29 Drawing Figures

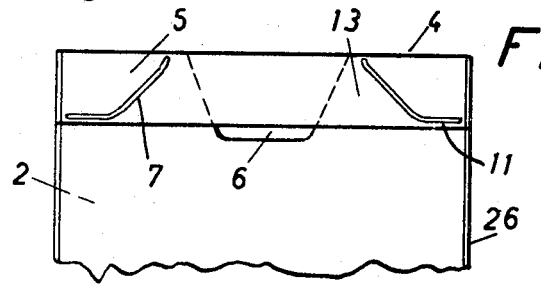
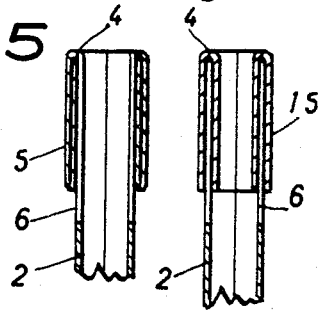
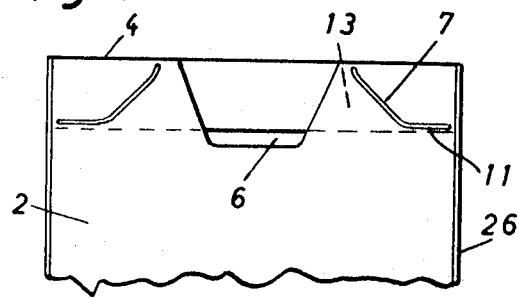
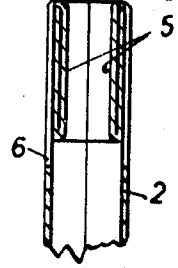
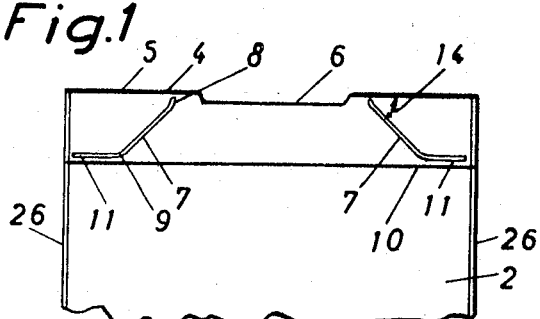
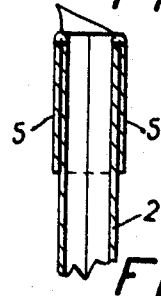
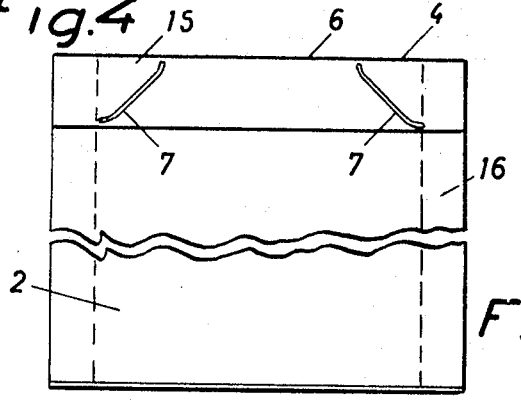
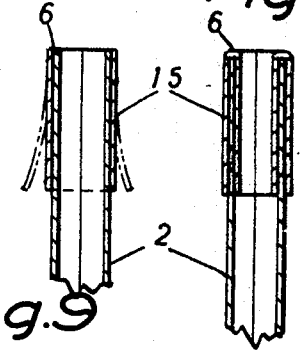
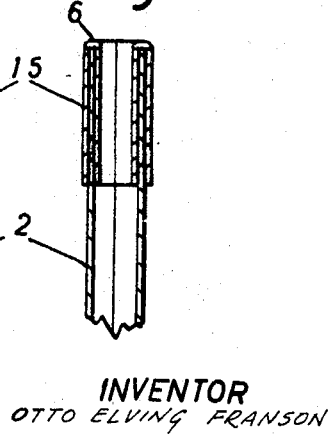

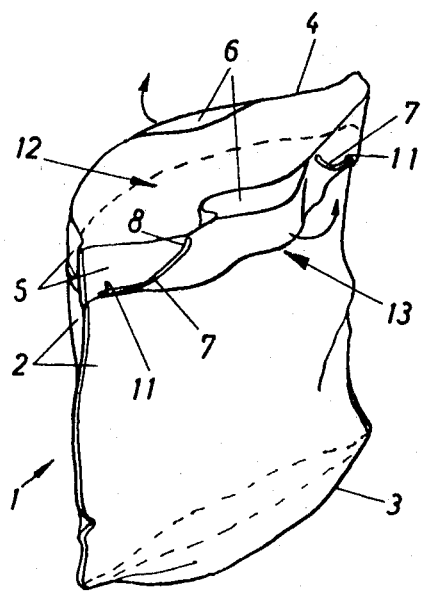
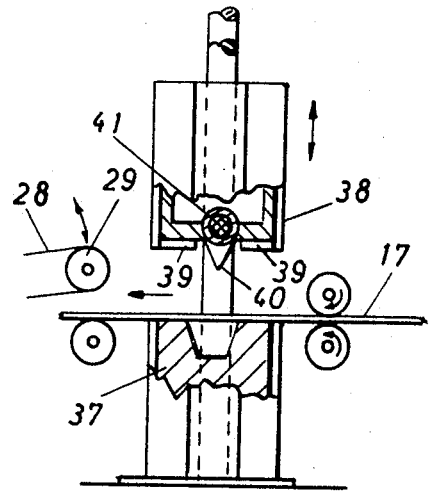
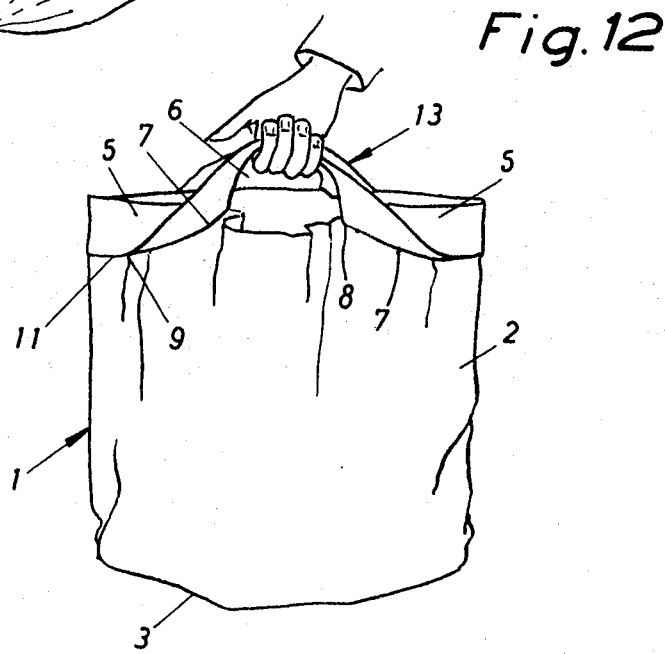

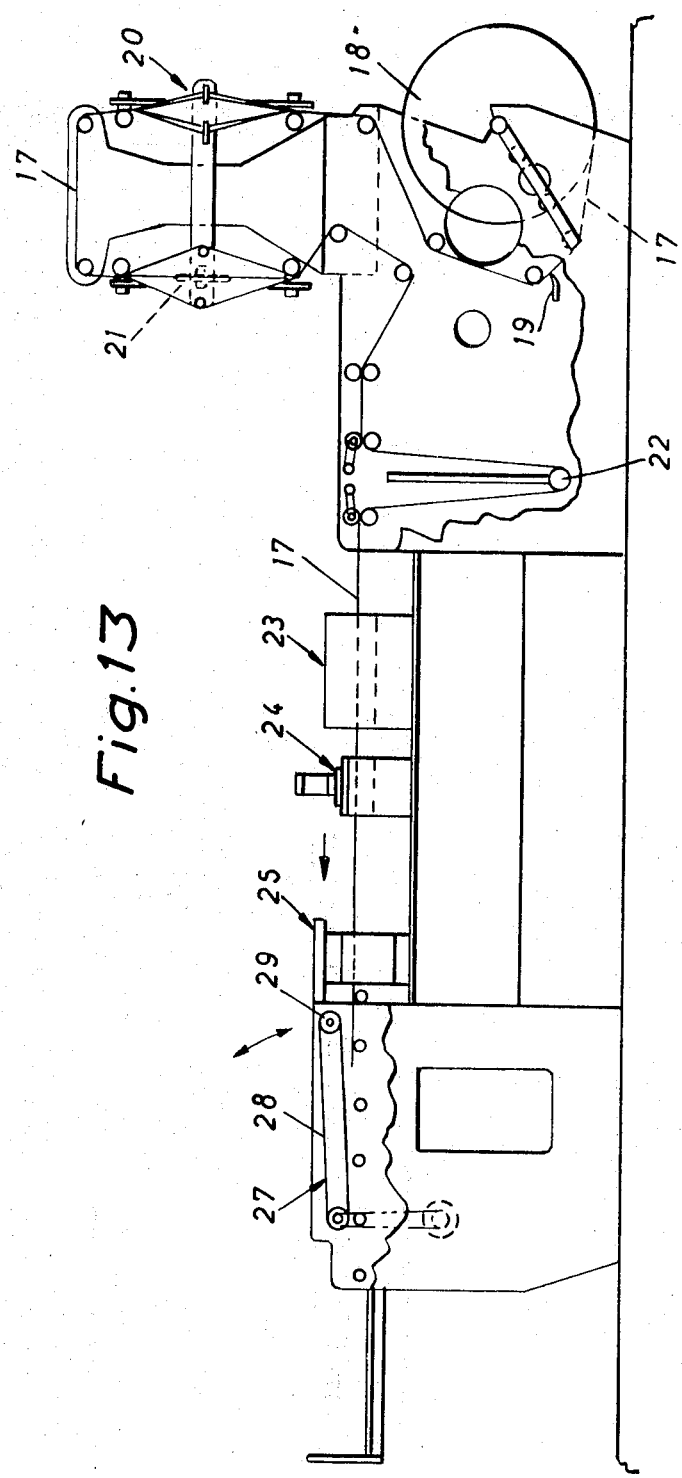

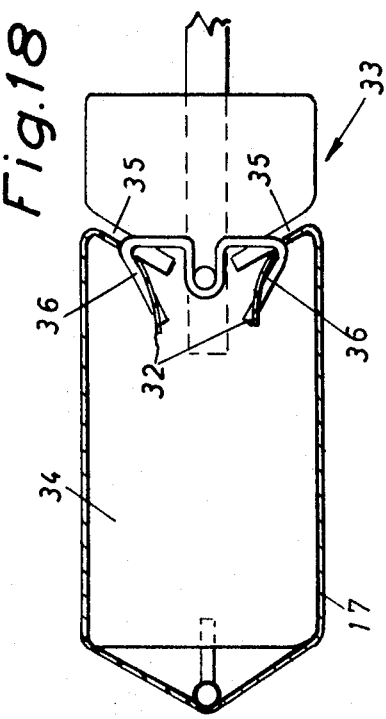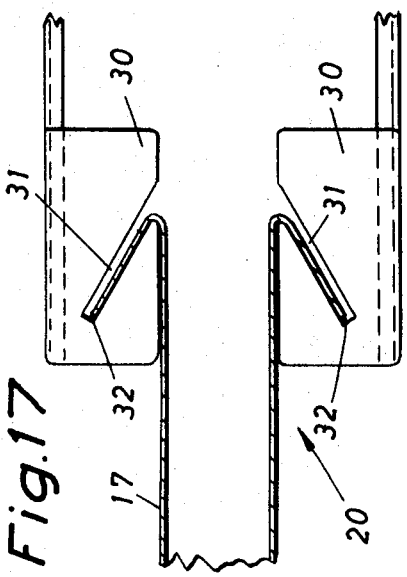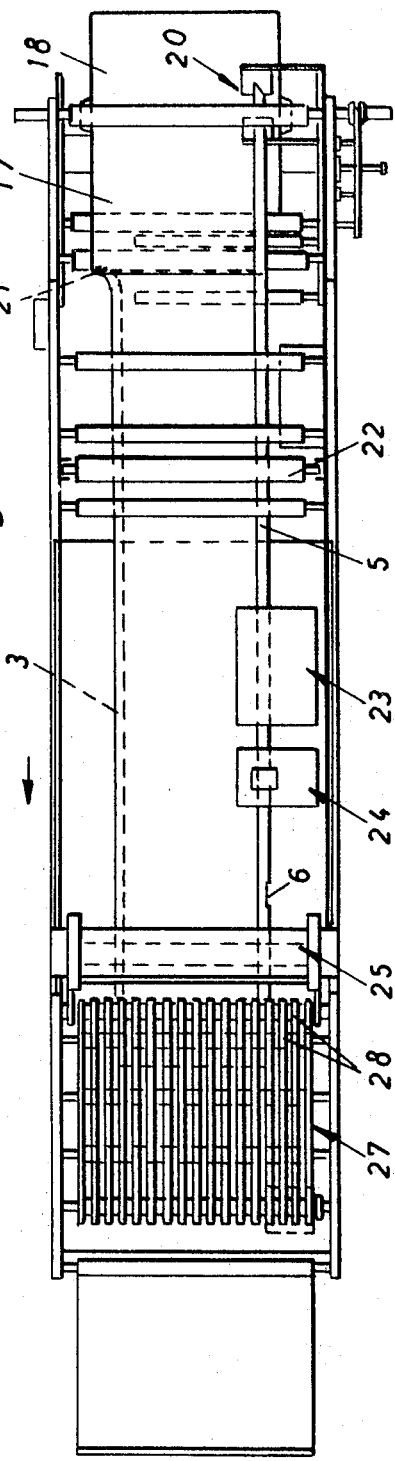

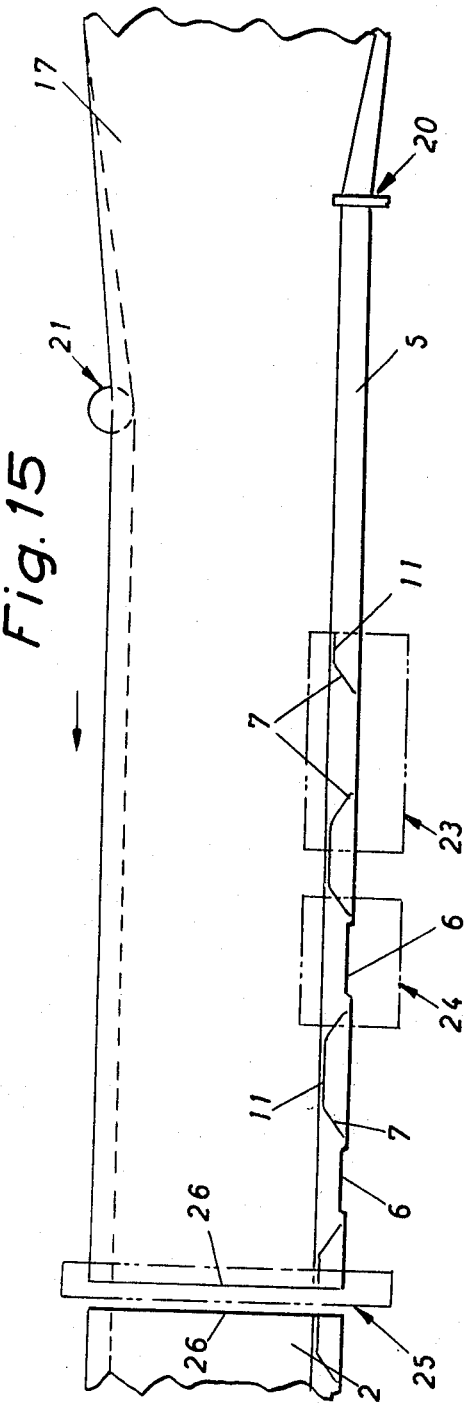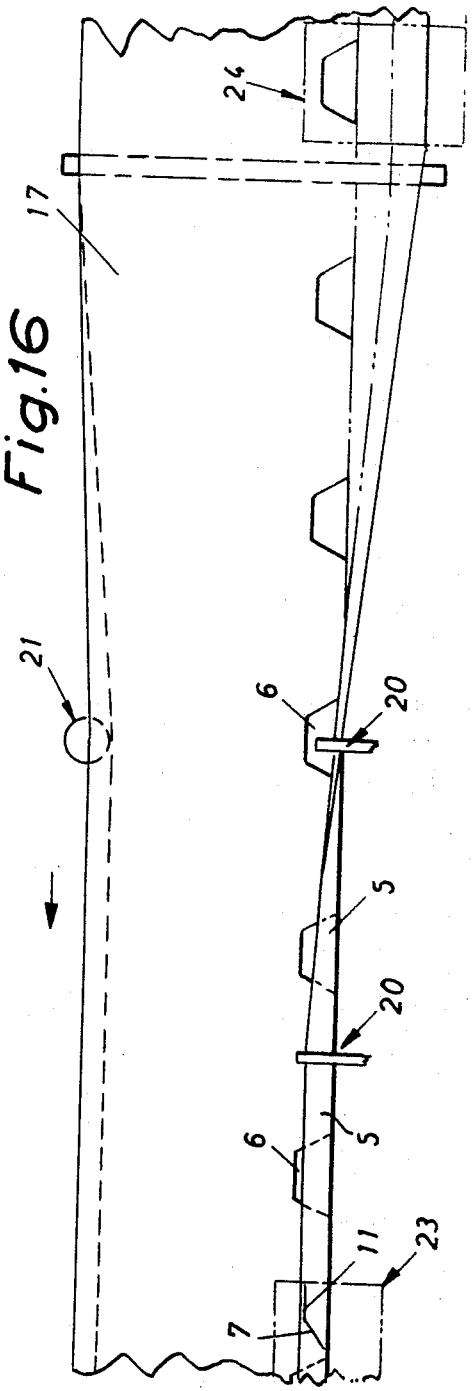

INVENTOR
OTTO ELVING FRANSON
BY
ATTORNEYS

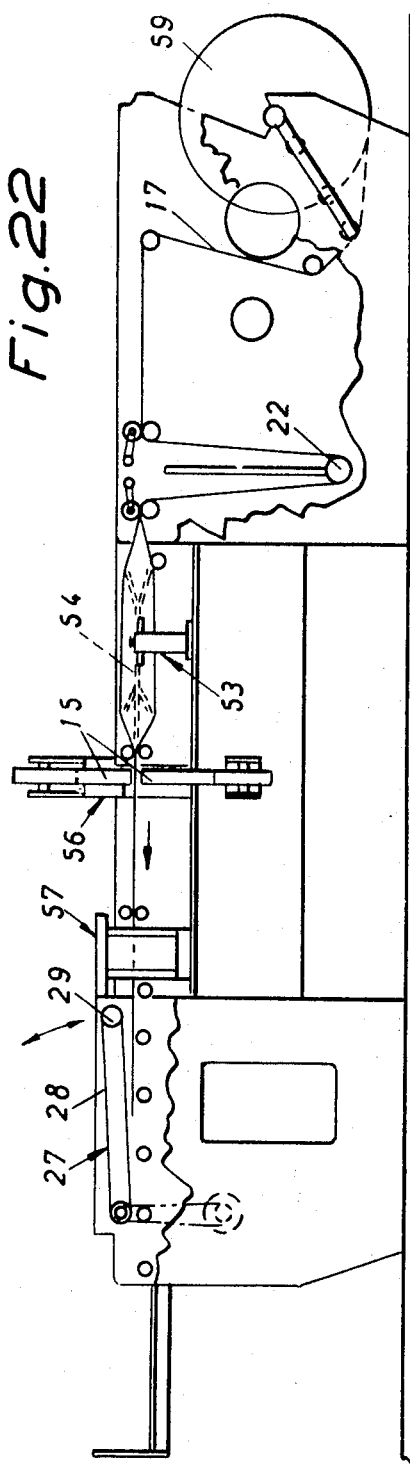
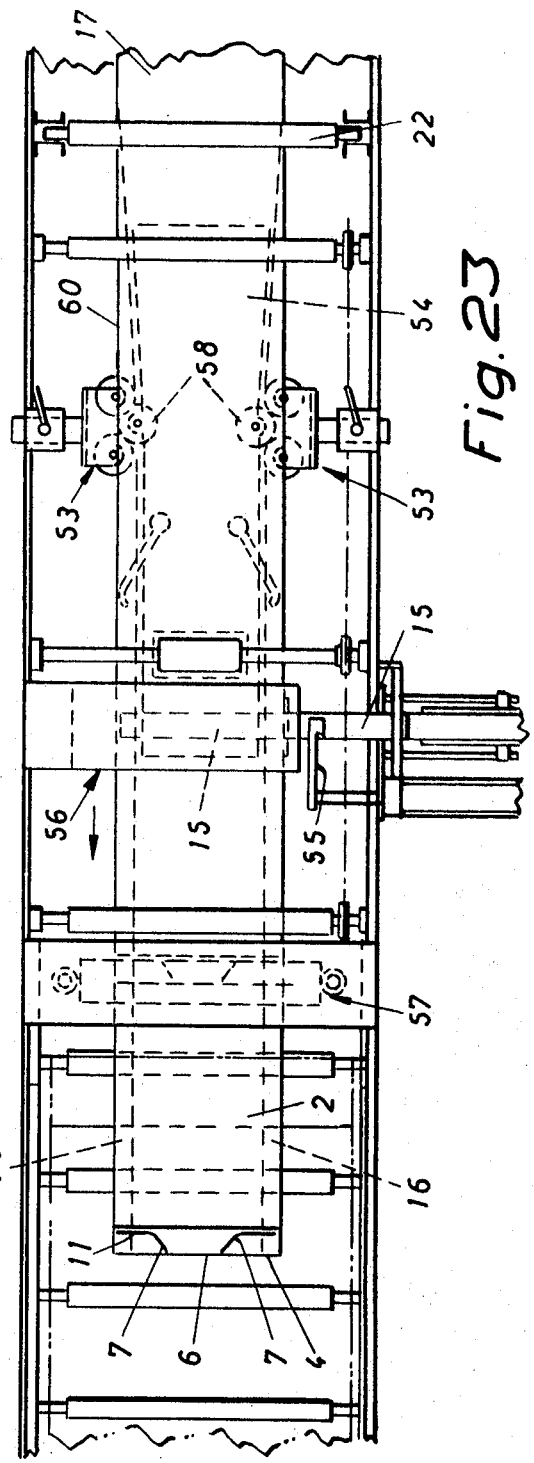

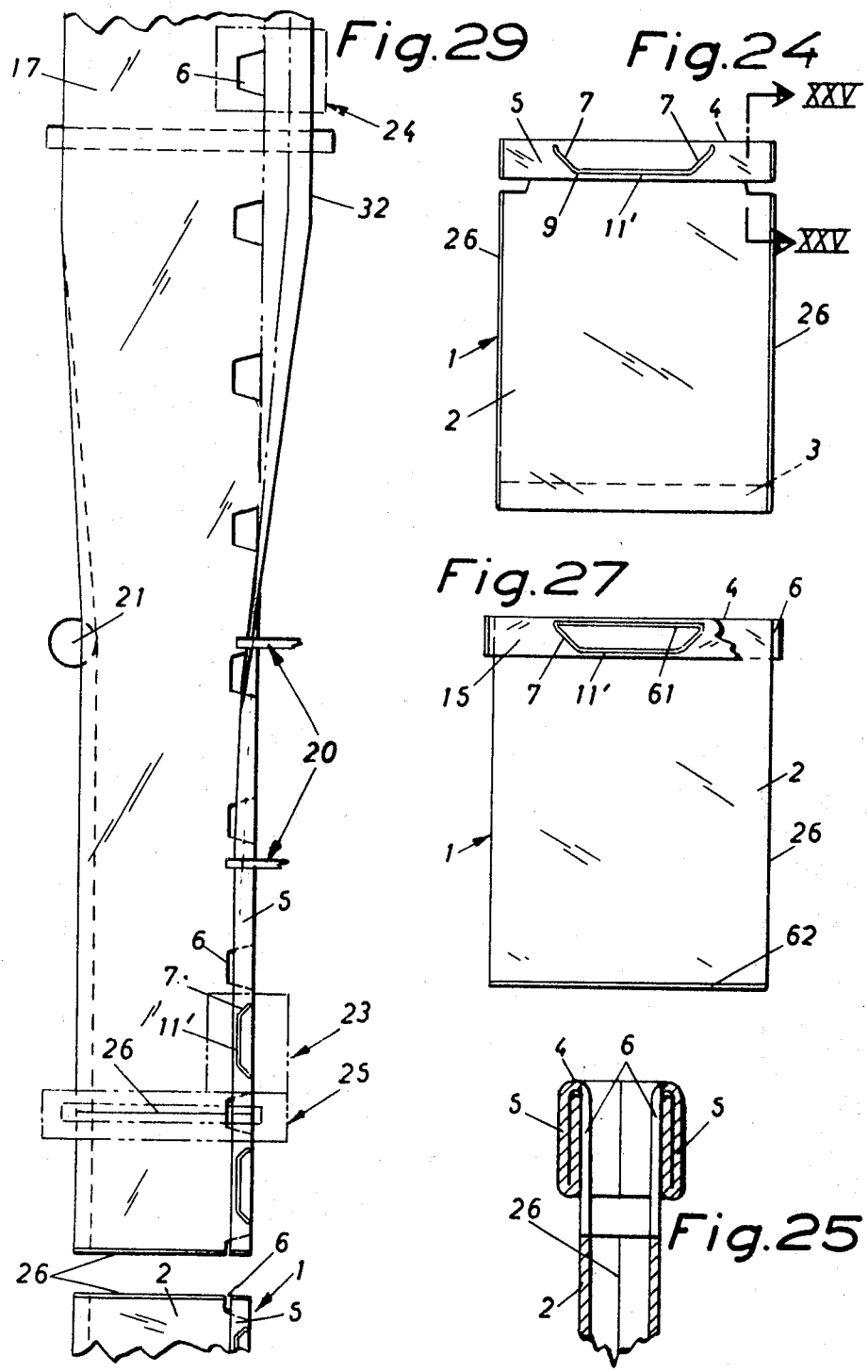

INVENTOR
OTTO ELVING FRANSON

CARRYING BAG PROVIDED WITH A HANDLE

BACKGROUND OF THE INVENTION

The present invention relates to a carrier bag consisting of weldable synthetic resin material which is provided with carrying grips and the opening edge of which is provided with one or more reinforcing folds and/or reinforcing strips and with two oppositely disposed carrying grip apertures.

The invention relates also to a method of producing carrier bags and to a machine for performing this method.

Owing to the recent development of the retail trade to provide sales outlets such as, for example, self-service shops or large stores in which the customers must be attended to quickly at cash desks and packing tables and in which so-called bulk purchases are made, spacious carrier bags are desirable which can be quickly filled with goods by the customers and which, moreover, have extremely high strength properties.

From the Swedish U.S. Pat. No. 209,307 a carrier bag is known which on the one hand is admittedly relatively durable, on the other hand is very simple to produce, but which has a plurality of disadvantages. This carrier bag is produced from a tubular synthetic resin foil web and is provided with bellows sides and with a wedge-shaped plain folded bottom. The carrying handles thereof are of the so-called "loop" type and are obtained by a rectangular cut-out in the centre of the tubular synthetic resin foil web. However, in order to be able to carry conveniently such a carrier bag filled with goods, a very large cut-out in the foil web is required which leads to a considerable loss of material in the production of carrier bags of such kind. Moreover, it is difficult and time consuming to fill such carrier bags with goods, because the opening edge thereof is in a "displaced" position, i.e. the opening of such a carrier bag cannot be fully opened out because of the particular construction of the carrying handles and folded sides. The carrying handles of this carrier bag thus impede the filling of the carrier bag with goods, and moreover this kind of carrier bag has no reinforcement at its opening edge, for which reason the carrier bag opening collapses very easily when goods are placed into the bag. Owing to the disposition of the carrying handles the carrier bag is carried with its greatest width transverse to the direction of walking, which can be very inconvenient for carrying the bag, because during walking a well filled carrier bag tends to knock against the legs of a person carrying this bag.

A further generally occurring type of carrier bag is provided with carrying handles which are formed quite simply by punching material out of the two wide sides of the carrier bag. Even if the opening edge of such a carrier bag were provided with a reinforcement strip, it would be difficult to obtain satisfactory stiffness or strength around the punched-out parts of the carrying grips. Such reinforcements would also increase considerably the costs for the production of such carrier bags. Attempts have also been made to reinforce the opening edge of carrier bags by roll-like enlargements in the synthetic resin foil web, or by increasing the thickness of the material at the centre part of the carrier bag. However, it is very difficult to provide synthetic resin foils of non-uniform thickness produced in this manner with satisfactory imprints, such as a text or pictures, and these measures also are unsuitable for receiving the concentrated stresses around the punched-out part. Furthermore, carrier grips punched out in this manner are normally not very gentle on the hands.

SUMMARY OF THE INVENTION

The purpose of the present invention is to avoid the disadvantages referred to above by a carrier bag which is characterised in that reinforcing folds and/or reinforcing strips are welded to the wide sides of the carrier bag by means of weld seams which taper that is to say are inclined in the direction of the opening edge of the carrier bag and which extend across the whole width of the reinforcing folds and/or reinforcing strips on both sides of the carrying grip openings.

The carrier bag according to the invention fulfills the high demands in respect of strength of the carrying grips. The stresses are uniformly distributed by way of the inclined weld seams which are four in number, for which reason each weld seam must thus absorb only a quarter of the load produced by the weight of the goods present in the carrier bag. For this reason the carrier bag according to the invention can be so dimensioned that a plurality of heavy articles can be carried in the same without the carrier bag tearing. The carrier bag can be easily kept completely open owing to the position of the carrying grips and can be filled with goods quickly and simply by a single person owing to the reinforcement of the opening edge of the bag, whereafter a hand can be easily inserted into the carrying grips and the carrier bag conveniently lifted and carried away. Moreover, the carrier bag according to the invention is extremely economic because of the simple method of production and because additionally only a small loss of material occurs.

BRIEF DESCRIPTION OF THE DRAWINGS

FIGS. 1 to 4 illustrate various embodiments of carrier bags according to the invention, partly broken and in side view, FIGS. 5 to 10 illustrate cross-sections through the upper ends of such carrier bags, FIG. 11 illustrates in perspective view a carrier bag resting on a support, FIG. 12 illustrates a side view of the same carrier bag lifted by means of the carrying grips thereof, FIG. 13 illustrates a side view of a machine according to the invention for producing carrier bags from a tubular synthetic resin web, FIG. 14 is a plan view of this machine, FIGS. 15 and 16 illustrate diagrammatically the production of carrier bags of two different embodiments, wherein a machine as shown in FIGS. 13 and 14 is used, FIGS. 17 and 18 illustrate elements for folding outwardly and inwardly, respectively, the free longitudinal edges of the synthetic resin web layers to form reinforcing folds at the opening edge of carrier bags, FIG. 19 illustrates a device for transversely welding and heat severing the synthetic resin web, FIGS. 22 and 23 illustrate a side view and a plan view, respectively, of a further embodiment of a machine for producing carrier bags according to the invention, FIG. 24 illustrates a side view of a carrier bag according to a further embodiment of the invention, FIG. 25 illustrates a section through this carrier bag along the line XXV—XXV in FIG. 24, on an enlarged scale, FIG. 27 illustrates a side view of a carrier bag according to a further embodiment, FIG. 29 illustrates diagrammatically the production of a carrier bag in accordance with the embodiments illustrated in FIGS. 24 to 26.

DETAILED DESCRIPTION OF A PREFERRED EMBODIMENT

Figure 20:
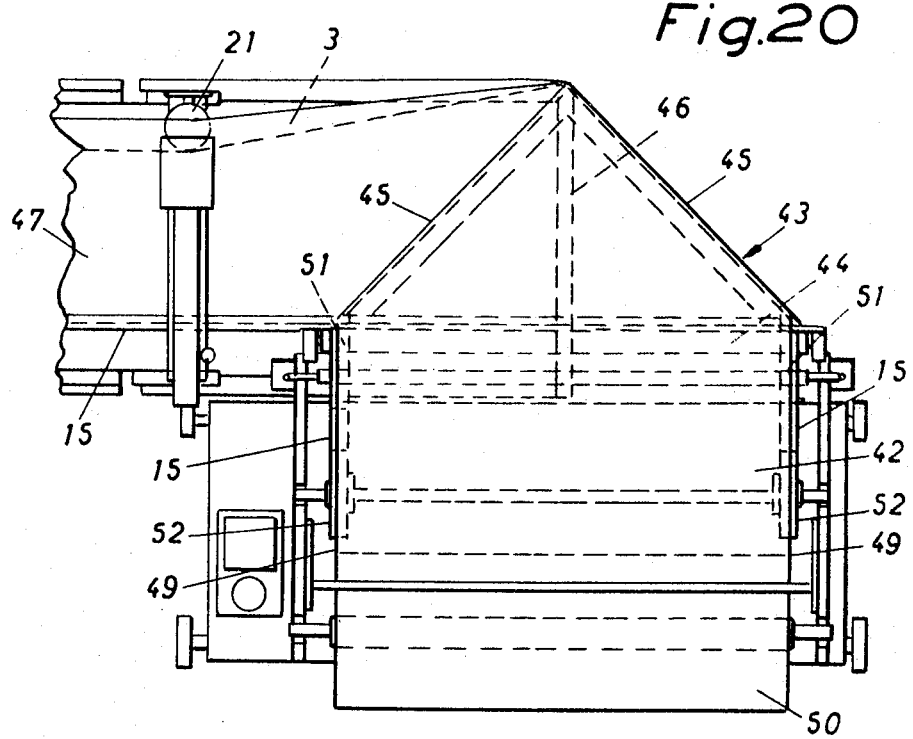
FIGS. 20 and 21 illustrate a plan view and a side view, respectively, of a device for folding in two plies a single flat synthetic resin web.

A carrier bag 1 according to the embodiment illustrated in FIGS. 1, 8 and 11, comprises two wide sides 2 and a folded bottom 3. The opening edge 4 of the carrier bag is reinforced by an outwardly folded fold 5. In the centre of the opening edge 4 two oppositely disposed carrying grip openings 6 are punched out. The carrier grip openings or finger passage means provide openings between the fold 5 which is also referred to herein as a grip strip or grip strip means and the bag bottom whereby the fingers of the user can pass therethrough to hold the grip strip means. The reinforcing fold 5 is welded to the wide sides 2 of the carrier bag 1 by means of weld seams 7 which extend across the whole width of the reinforcing fold on both sides of each carrying grip opening 6 and which taper, i.e. are inclined in the direction toward the opening edge 4. These weld seams are curved slightly, rising obliquely outwardly at their respective ends 8,9. Alternatively they may be straight weld seams, i.e. without curved ends. The lower end 9 of the weld seam 7 extends into a short weld seam 11 which extends along the lower edge 10 of the reinforcing fold 5 in an outward direction.

As may be seen, for example, from FIG. 11, the opening 12 of the carrier bag 1 stays open without special help during the insertion of goods owing to the stiffening obtained by the disposition of the reinforcing fold 5 at the opening edge 4. It may be seen from FIG. 12 that four fingers of one hand can be inserted simply under the reinforcing fold 5 and through the carrying grip openings 6 of the carrier bag from the one side thereof; simultaneously, however, if desirable the thumb can also be inserted through the carrying grip openings 6 and can be guided under the reinforcing fold 5 of the other side of the carrier bag 1 in order to form there a fist with the four fingers of this hand. Thereafter the carrier bag is lifted. The carrying grips 13 of the bag are thus formed by the centre part of the reinforcing folds between the two inclined weld seams 7. The tension stresses occuring between the carrying grips 13 and the wide sides 2 when a carrier bag 1 filled with goods is lifted are absorbed by the inclined weld seams 7 which include an angle 14 of approximately 40° to 50°, preferably, however, 45° with the opening edge 4 of the carrier bag 1 in order that the tensional stresses are uniformly distributed over the total length of the inclined weld seams 7. In practice a further compensation of the occurring stresses is obtained by the outwardly curved ends 8,9 of the weld seams 7.

The tensional strength of the carrying grip part 13 is extremely high, in particular when the carrier bag 1 is produced in such manner that the longitudinal direction of the carrying grip coincides with the longitudinal direction of a synthetic resin web, because generally the synthetic resin webs are considerably stronger in their longitudinal direction than in their transverse direction.

By the construction of the opening edge 4 with a doubled reinforcing fold 5, such as illustrated for example in an embodiment according to FIGS. 2 and 5, a particularly high carrying strength and stiffness of the opening edge 4 is obtained. In this embodiment the carrying grip openings extend slightly below the reinforcing folds 5, whereby additionally the insertion of a hand into the carrying grip openings is considrably facilitated and the carrying grips 13 can be more easily embraced.

In FIG. 6 a further embodiment is illustrated in which the place of the reinforcing folds 5 is taken by stiffening strips 15 which are folded over the opening edge 4 of the carrier bag 1.

FIGS. 3 and 7 illustrate an embodiment which is similar to the embodiment in FIG. 2, wherein, however, the doubled reinforcing folds 5 are folded inwardly.

FIGS. 4 and 9 illustrate a carrier bag 1 the opening edge 4 of which is stiffened by a simple reinforcing strip 15 which is attached to the wide sides 2 of the carrier bag 1 by inclined weld seams 7 absorbing the tensional loads and additionally its parts located outwardly of the weld seams are attached by means of welding or by means of an adhesive. This carrier bag 1 is furthermore provided with so-called bellows sides 16.

FIG. 10 illustrates a constructional example in which the reinforcing strips 15 are folded over the opening edge 4 as in FIG. 6. Each of the carrier grip openings 6 in FIG. 10 are, however, formed simply by a slot disposed on both sides of the opening edge 4 of the carrier bag.

In the production of carrier bags 1 according to the embodiments illustrated in FIGS. 1 and 8, preferably a machine is used which is illustrated in FIGS. 13 and 14 and in which the production of the carrier bags is begun from a tubular synthetic resin web 17 which is drawn continuously off a storage reel 18. This machine is fitted with driving devices (not illustrated) which guide the tubular synthetic web 17 over a plurality of driving and guiding rolls through various treatment stations. These stations comprise mainly means 19 for slitting the one side of the synthetic resin tube 17 in its longitudinal direction, elements 20 for folding outwardly the free longitudinal edges of the synthetic resin layers obtained by the slitting process, as well as elements 21 for providing the folded bottom 3 of the carrier bag 1. In order to enable a transition from the continuous supply of the synthetic resin web 17 to an intermittent supply thereof to be obtained, the synthetic resin web 17 is loaded by a guide roller 22 which is disposed so that it is easily movable in a vertical direction and which holds the web 17 continuously under tension. Following thereafter in the machine there is provided an automatic welding device 23 for producing the inclined web seams 7 as well as the short weld seams 11 in the reinforcing folds 5 at the opening edge 4 of the respective carrier bag 1. The automatic welding device 23 is preferably arranged in such manner that it welds simultaneously the reinforcing folds 5 at the opening edge 4 on both sides of the carrier bag 1. If a synthetic resin web 17 is not provided on its inside with a pigment which prevents the facing walls of the opening 12 of the carrier bag 1 from being welded together, the automatic welding device 23 must obviously be provided with an insulating plate (not illustrated) which can be inserted into the opening 12 of the respective carrier bag during the welding process. Furthermore, a device 24 is provided in the machine for punching out carrying grip openings 6, elements 25 for welding the side edges 26 of the carrier bag 1 and for simultaneously severing by heat the synthetic resin web 17, as well as a feeder means 27 for individually delivering the finished carrier bags 1. This feeder means 27 consists of a plurality of conveyor belts 28 which rotate continuously around a vertically reciprocable roll 29.

The element 20 for folding outwardly the free longitudinal edges of the synthetic resin web 17 consists, as illustrated for example in FIG. 17, of two folder rails 30 each of which is provided with an inclined slot 31, through which slots travel the two free longitudinal edges 32 of the slit-open synthetic resin web 17. FIG. 18 illustrates an element 33 for folding inwardly the free longitudinal edges 32 of the slit-open synthetic resin web 17. For obtaining the reinforcing folds of the carrier bag illustrated in FIGS. 3 and 7, however, two successively disposed elements 33 are necessary in order that the doubled reinforcing fold 5 can be obtained. This element 33 consists of a spacer plate 34 which extends between the two synthetic resin layers of the slit-open synthetic resin web 17 and which is provided with two slots 35 which taper in an inward direction and through which travel the free longitudinal edges 32 of the slit-open synthetic resin web 17. For the purpose of completing the folding process, a wire bow member 36 is disposed beyond the slots 35. In machines for producing carrier bags 1 having carrying grip openings 6 (see FIGS. 2 and 3) which extend slightly below the reinforcing folds 5, the folding elements 20, 33 must, however, be disposed beyond the punching device 24, in contrast to the machine illustrated in FIG. 13.

The element 25 for simultaneously welding together the edge portions 26 and heat severing the synthetic resin web 17 is illustrated in FIG. 19 by way of example. In this Figure, a stationary counter holder 37 is disposed below the element 25 through which the synthetic resin web 17 travels, and a welding apparatus 32 which can be raised and lowered is disposed above the web and has two parallel welding jaws 39 which extend across the whole width of the synthetic resin web and a heatable cutting edge 40 which is located between the two welding jaws. The two welding jaws 39 and the cutting edge 40 are heated by means of an electrical resistance element 41.

In the production of a carrier bag 1 according to the embodiment illustrated in FIGS. 1, 8, 11 and 12, using the machine illustrated by way of example in FIGS. 13 and 14, the procedure is as follows, wherein, however, a tubular synthetic resin web 17 (see the diagram in FIG. 15) is used as starting material.

The synthetic resin web 17 is drawn off a storage reel 18 and is slit open in its longitudinal direction at one side by means of the element 19 (FIG. 1), whereafter the free longitudinal edges 32 of this web thus obtained are folded outwardly by means of the folding members 20 to form reinforcing folds; thereafter the bottom 3 is provided in the carrier bag 1 by means of the folding element 21, the inclined and short weld seams 7, 11 are produced by means of the automatic welding device 23, the carrying grip openings 6 are pushed out by means of the punching device 24, the edges 26 of the carrier bag 1 are welded to each other and finally the synthetic resin web 17 is severed by means of the welding and severing element 25, whereupon finally the finished carrier bags are successively conveyed out of the machine by means of the feeder member 27.

It may be seen from the production diagram illustrated in FIG. 16 that in the production of carrier bags 1 with carrying grip openings 6 which are visible slightly below the reinforcing folds 5, these carrying grip openings are punched out of the web by means of a device 24 as previously mentioned, before the folding process is started, which latter is effected in two separate stages for the purpose of obtaining doubled reinforcing folds 5.

Figure 21:
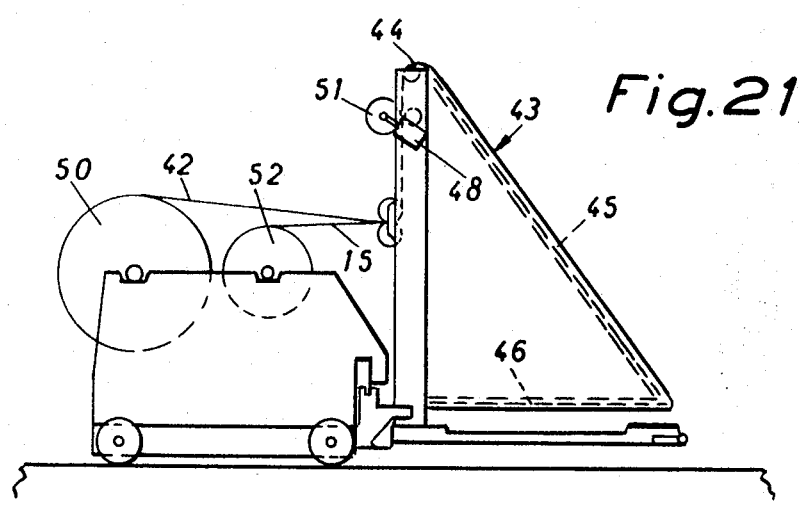

If, however, a simple synthetic resin web 42 is used as starting material for the production of carrier bags 1, a device 43 for folding this web in two is required. FIGS. 20 and 21 illustrate an example of such a device 43 which is arranged to produce carrier bags 1 the opening edge 4 of which is provided with reinforcing strips 15. In this folding device 43 a guide roll 44 is provided over which the single synthetic resin web 42 is guided in an obliquely downward direction, is subsequently drawn over two folder rails 45 which extend obliquely downwardly from this roll and which are disposed in V-form, so that two synthetic resin web portions are formed both of which are finally guided together by a common lower feed roll or folder rail 46 which is disposed horizontally, whereby a doubled synthetic resin web 47 is formed. Prior to folding in two the web 42 which is drawn from a storage reel 50, reinforcing strips 15 are attached to the free longitudinal edges 49 of the single web by means of welding elements 48. The welding elements 48 are disposed at each longitudinal edge 49, and each is provided with a welding roller 51 which rotates together with the web and which in turn attaches a reinforcing strip drawn off a storage reel 52 associated therewith to the respective longitudinal edges of the web in such manner that half the width of the strip extends beyond the free longitudinal edge of the web 42. After the synthetic resin web has been folded over in two plies the reinforcing strips 15 are folded over in the same manner as the longitudinal edge parts 32 in the example described above, whereafter the production of the carrier bags is continued also in the same manner as in the example referred to.

FIGS. 22 and 23 illustrate a machine for producing carrier bags according to a further constructional example, wherein a tubular synthetic resin web 17 is used as starting material. In this machine there are provided elemnts 53 for producing the bellows sides 16, a plate 54 for preventing unintentional welding together of the opening 12 of the carrier bag 1, for the case that the inside of the synthetic resin web 17 is not provided with a colour pigment, elements 55 for supply reinforcing strips 15 transversely to the longitudinal direction of the web 17 both above and below the web, as well as an element for severing the strips by heat, and automatic welding device 56 for attaching the reinforcing strips to the web, an automatic welding apparatus 57 for welding the web together and for severing the same, as well as a feeder means 27 for individually conveying away the finished carrier bags. The plate 54 is disposed inside the tubular synthetic resin web 17 and is held in position by horizontal guide wheels 58 which roll on wheels which enter into the element 53 for obtaining the bellows sides 16 of the carrier bags to be produced.

The production of a carrier bag according to the embodiment illustrated in FIG. 4 using the machine illustrated in FIGS. 22 and 23 is effected as follows:

The tubular synthetic resin web 17 is continuously drawn off a storage reel 59; thereupon the web is given a stepwise advance movement by the guide roller 22 referred to in the previous example, the longitudinal edges 60 are folded in by means of the folder member 53, reinforcing strips are supplied by means of the feeder element 55, and finally these strips are securely welded to the web by means of the automatic welding apparatus 56. The synthetic resin web is severed transversely, whereupon the two synthetic resin layers are welded to each other by means of the automatic severing and welding device 57; thereafter the finished carrier bags 1 are individually conveyed away from the machine by means of the feeder element 27.

In the variants of carrier bags 1 illustrated in FIGS. 24 to 29, the side edges 26 are displaced by approximately half the width of the bag relatively to the carrying grips 6 in comparison with the example described above. In the production of these carrier bags in accordance with the invention some advantages in the production technique are obtained. Even though the bottom of the carrier bag when the same is carried extends mainly at right angles to the longitudinal direction of the opening edge so that such carrier bag, when it is filled with articles tends to knock against the legs of the person carrying this bag while walking, this disadvantage can be quite simply avoided in that the hand carrying the carrier bag is rotated through 90°.

In the example illustrated in FIG. 24, the carrier bag 1 is provided at its opening edge 4 with a reinforcing fold 5 and with a bellows bottom 3. Furthermore a longitudinally directed weld seam 11' extends between the mutually adjacent ends 9 of the oblique weld seams 7, whereby a coherent weld seam having upwardly diverging inclined weld seams 7 is obtained. In this example the carrying openings 6 have a parallel trapezoidal shape and extend to a level slightly below the reinforcing fold 5. According to the invention these carrying grip openings 6 are disposed at the side edges 26 of the carrier bag 1 and extend on both sides thereof into the wide sides 2 of the carrier bag 1.

It may be seen from the cross section illustrated in FIG. 25 on an enlarged scale that the reinforcing fold 5 is double folded and that the carrying grip openings 6 extend upwardly as far as the opening edge 4 of the carrier bag.

Figure 26:
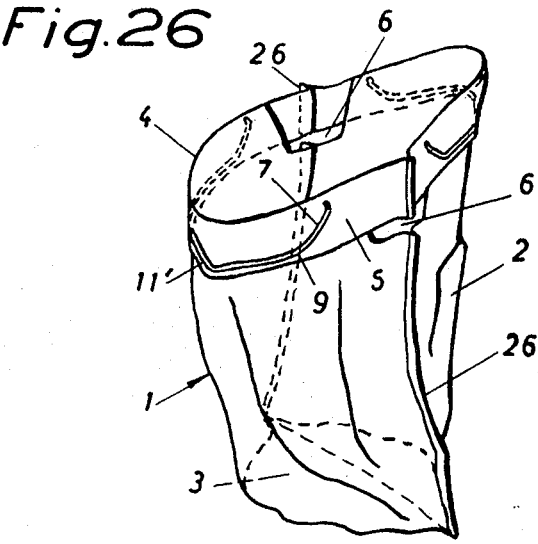
FIG. 26 illustrates in perspective view a carrier bag in accordance with the embodiment according to FIG. 24.

The perspective illustration in FIG. 26 shows the shape of the carrier bag 1 when filled with foodstuffs. The reinforcing fold 5 stiffens the opening of the carrier bag in such manner that the opening cannot collapse in itself or can close inadvertently when goods are to be packed into the carrier bag.

FIG. 27 illustrates the carrier bag 1 according to a further embodiment with a carrying grip opening 6 in the form of gaps provided at the opening edge 4. In this example the bag is provided with a reinforcing strip 15 extending across each wide side 2. The strips extend slightly beyond the side edges 26 of the carrier bag where they are welded together. Each reinforcing strip 15 is attached to the carrier bag 1 by means of the inclined weld seams 7 and the longitudinally directed weld seams 11', and additionally by means of weld seams 61 which extend along the opening edge 4 of the carrier bag 1. The carrying grip openings 6 are formed in this case by the gap which is produced by the fact that the respective reinforcing strip 15 is not welded to the opening edge 4 at this point. The carrier bag 1 illustrated in FIG. 27 is furthermore provided with a plain folded or wedge-shaped bottom 62.

Figure 28:
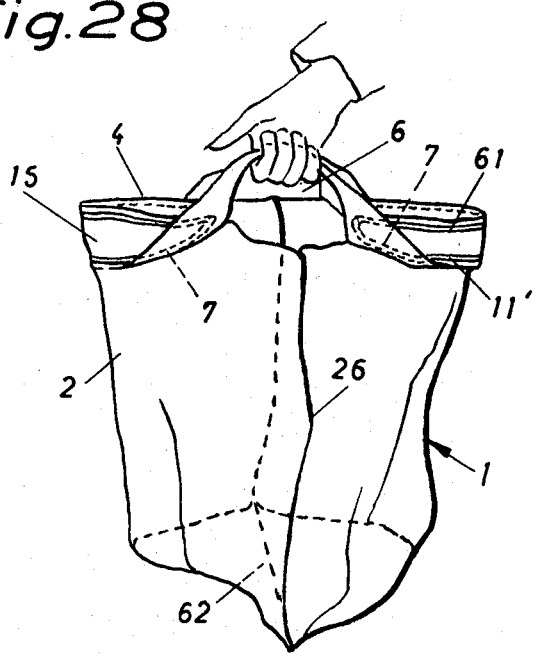
FIG. 28 illustrates the same carrier bag in a lifted position.

The shape of the carrier bag according to FIG. 2 when carried may be clearly seen from FIG. 28. In this position the bottom 62 extends substantially at right angles to the longitudinal direction of the opening edge 4. This Figure of the drawings illustrates that though the bottom 62 extends in this direction, the tensional stresses are uniformly distributed over the inclined weld seams 7 and over the parts of the wide sides of the carrier bag 1 located therebelow.

The carrier bag 1 illustrated in FIGS. 24 to 26 is produced from a tubular synthetic resin web 17 which is slit open along the one side thereof, or is alternatively produced from a synthetic resin web 47 folded in two plies. As shown diagrammatically by way of example in FIG. 29, the carrying grip openings are punched out of the web of material by means of a punching device 24; thereafter the free longitudinal edges 32 are folded over twice by by means of the two folder elements 20, and the bottom 3 of the carrier bags is folded in by means of the folder element 21. The inclined weld seams 7 and the longitudinally directed weld seam 11' are produced by means of the automatic welding device 23, whereafter the synthetic resin web is severed in the transverse direction and the side edges 26 of the carrier bag are welded together by means of the welding and severing element 25. In this case severing and welding together is effected in such manner that the carrying grip openings 6 are divided in the centre and the severed reinforcing folds 5 are welded together.

The carrier bag illustrated in FIGS. 27 and 28 is produced from a tubular synthetic resin web 17 by means of the machine illustrated in FIGS. 22 and 23. The bottom 62 and the opening edge 4 of the bag are thus formed simply by welding together and heat severing the two synthetic resin layers in the transverse direction of the web. The reinforcing strips 15 supplied to and disposed on the two sides are severed slightly outside the side edges 26 of the carrier bag being produced, and are welded together, in which case as mentioned above, not only the inclined weld seams 7 and the longitudinally directed weld seam 11' are produced, but also additionally a weld seam 61 which extends along the opening edge 4 between the weld seams 7, which diverge in pairs in the direction towards the opening edge 4.

However, the invention is not limited to the examples illustrated and described above and may be modified in various manners within the scope of the following claims. It is conceivable that in the embodiments illustrated by way of example in FIGS. 22 and 23 only the inclined weld seams are produced by means of the automatic welding apparatus 56 and the portion of the reinforcing strips 15 located outwardly of these weld seams is adhesively attached to the opening edge 4 of the carrier bag 1. It is also conceivable that in this machine a device for punching out carrying grip openings 6, for example of the kind illustrated in FIGS. 2 and 3, are disposed ahead of the automatic welding apparatus 56 and the plate 54. Carrier bags 1 have been described above which are provided either with reinforcing folds 5 or reinforcing strips 15, but the carrier bags may be provided according to the invention alternatively with doubled folds or simultaneously with folds as well as with strips. Furthermore, the carrying grip opening 6 of the kind illustrated in FIG. 1 may advantageously be produced by slitting instead of by punching, whereby then any loss of material is avoided, catching storing and carrying away of which latter may provide difficulties. Finally it is also conceivable that the inclined weld seams 7 are displaced parallel outwardly to such extent that the lower end 9 thereof extends beyond the side edges 26 of the carrier bag 1 in which case the short weld seams 11 can be completely omitted.

What I claim is:

1. An improved carrier bag consisting of a weldable synthetic resin material forming said bag with a closed bottom and an open top, grip strip means provided on said bag at the opened top thereof, first and second spaced weld seam sections connecting said grip strip means and said bag, each of said first and second weld seam sections being inclined toward the open top of said bag, third and fourth spaced weld seam sections connecting said grip strip means and said bag, each of said third and fourth weld seam sections being inclined toward the open top of said bag, first finger passage means between said first and second weld seam sections, second finger passage means between said third and fourth weld seam sections, each finger passage means being formed by a substantially parallel trapezoidal recess in the carrier bag, the one parallel side of the recess being substantially flush with a top of said bag and the second parallel side of the recess being located below said grip strip means, said finger passages providing an opening between said grip strip means and said bag bottom whereby the fingers of a user can pass therethrough to hold said grip strip means, and each of said first, second, third and fourth weld seams being substantially equally distant from adjacent weld seams.

2. A carrying bag with a handle and comprising a weldable plastic material, the opening border of the bag provided with a number of reinforcing folds formed by a folding at the top of the wide sides of the bag, said reinforcing folds being attached to both sides of the wide sides of said bag by means of first and second welds and extending over the width of the folds and converging towards the opening border by extending obliquely, and holes serving as handle openings arranged at the opening border between the ends of the oblique welds and spaced therefrom and thereby that the same divide the opening border in four portions of essentially equal size.

3. A carrying bag in accordance with claim 2 in that each handle opening comprises a punched hole of essentially parallel trapezoidal shape in the wide sides of the bag, one of the parallel sides of the punched hole substantially coinciding with the opening border and the other parallel side being situated below the reinforcing folds.

* * * * *